(12) United States Patent
Shao et al.

(10) Patent No.: US 11,695,879 B2
(45) Date of Patent: Jul. 4, 2023

(54) IMAGE CALIBRATION BASED ON A CALIBRATION MARK ON A CALIBRATION IMAGE MARKING A CALIBRATION EVENT OR EVENT TYPE MATCHING WITH A CURRENT CALIBRATION OPERATION

(71) Applicant: Zhuhai Pantum Electronics Co., Ltd., Zhuhai (CN)

(72) Inventors: Zhe Shao, Zhuhai (CN); Shiyan Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/691,344

(22) Filed: Mar. 10, 2022

(65) Prior Publication Data

US 2022/0311877 A1 Sep. 29, 2022

(30) Foreign Application Priority Data

Mar. 25, 2021 (CN) .......................... 202110318405.X (51) Int. Cl.
*H04N 1/00* (2006.01)
*H04N 1/23* (2006.01)
(Continued)

(52) U.S. Cl.
CPC ..... *H04N 1/00015* (2013.01); *H04N 1/00037* (2013.01); *H04N 1/00076* (2013.01);
(Continued)

(58) Field of Classification Search
None
See application file for complete search history.

(56) References Cited

U.S. PATENT DOCUMENTS 6,048,117 A * 4/2000 Banton .............. H04N 1/00002
400/74
7,436,549 B2 * 10/2008 Venable ............... H04N 1/6033
358/1.9
(Continued)

FOREIGN PATENT DOCUMENTS

CN 101090446 A 12/2007
CN 101316313 A 12/2008
(Continued)

*Primary Examiner* — Scott A Rogers
(74) *Attorney, Agent, or Firm* — Anova Law Group, PLLC (57) ABSTRACT

Embodiments of the present disclosure provide an image calibration method, an image forming apparatus, and a storage medium. The method includes outputting a calibration image in response to a calibration instruction, where the calibration image includes a calibration pattern and a calibration mark; according to the calibration mark of the calibration image, determining whether a calibration event corresponding to the calibration image matches a calibration event corresponding to a current calibration operation, or determining whether a calibration event type corresponding to the calibration image matches a calibration event type corresponding to a current calibration operation; and performing image calibration according to the calibration pattern in the calibration image if the calibration event corresponding to the calibration image matches the calibration event corresponding to the current calibration operation, or if the calibration event type corresponding to the calibration image matches the calibration event type corresponding to the current calibration operation.

16 Claims, 8 Drawing Sheets

(51) Int. Cl.
  *H04N 1/32* (2006.01)
  *H04N 1/60* (2006.01)
  *H04N 1/58* (2006.01)

(52) U.S. Cl.
  CPC ..... *H04N 1/00087* (2013.01); *H04N 1/00968* (2013.01); *H04N 1/2338* (2013.01); *H04N 1/32133* (2013.01); *H04N 1/58* (2013.01); *H04N 1/605* (2013.01); *H04N 1/6033* (2013.01); *H04N 2201/3269* (2013.01)

(56) References Cited

U.S. PATENT DOCUMENTS

| | | | |
|---|---|---|---|
| 8,547,611 B2* | 10/2013 | Ohkawa | H04N 1/00411 358/1.9 |
| 10,520,872 B2* | 12/2019 | Maeda | H04N 1/3872 |
| 2004/0114157 A1* | 6/2004 | Linder | H04N 1/6033 358/1.9 |
| 2006/0028699 A1 | 2/2006 | Venable et al. | |
| 2009/0033957 A1* | 2/2009 | Hardy | H04N 1/00002 358/1.9 |
| 2011/0141529 A1 | 6/2011 | Iinuma | |
| 2020/0053228 A1 | 2/2020 | Arakane et al. | |
| 2022/0188584 A1* | 6/2022 | Tomii | H04N 1/00811 |

FOREIGN PATENT DOCUMENTS

| | | |
|---|---|---|
| EP | 1385119 A2 | 1/2004 |
| JP | H08293023 A | 11/1996 |

\* cited by examiner

IMAGE CALIBRATION BASED ON A CALIBRATION MARK ON A CALIBRATION IMAGE MARKING A CALIBRATION EVENT OR EVENT TYPE MATCHING WITH A CURRENT CALIBRATION OPERATION

CROSS-REFERENCE TO RELATED APPLICATION

This application claims the priority to Chinese patent application No. 202110318405.X, filed on Mar. 25, 2021, in the China National Intellectual Property Administration, the entirety of which is incorporated herein by its reference.

TECHNICAL FIELD

The present disclosure generally relates to the field of image forming apparatus technology and, more particularly, relates to an image calibration method, an image forming apparatus, and a storage medium.

BACKGROUND

An image forming apparatus is an apparatus that forms an image on a recording medium by an image forming principle, such as a printer, a copier, a facsimile machine, a multifunctional image forming and copying apparatus, an electrostatic printing apparatus, and any other similar apparatus.

To obtain higher quality images, before using the image forming apparatus for job output, a calibration operation may need to be performed on the image forming apparatus. The calibration operation may include registration calibration processing, concentration calibration processing, and the like. For example, a color shift detection image, a concentration calibration image and the like may be printed on print papers by the image forming apparatus, then image data may be read by scanning the print papers, and the calibration may be performed. For example, the image forming apparatus with color image forming function may print color images on print papers using four colors of yellow, magenta, cyan and black, and may perform ACR (automatic color registration) to precisely align color registration at desired positions on print papers. The ACR function may be to calibrate relative positions where the four colors are formed so that the images of the four colors may be accurately aligned, and the image quality may be improved when the ACR function is executed.

In a practical application scenario, a user may place the calibration image incorrectly, so that the image forming apparatus may perform calibration according to the incorrect calibration result, resulting in a calibration error.

For example, the user may print two calibration images at different times on a same image forming apparatus and may misplace the two calibration images which are printed at different times. If the image forming conditions are changed during this time period (such as replacement of image forming components), it may result in a calibration error. The user may also misplace calibration images on two or more different image forming apparatuses, resulting in a calibration error.

In addition, the user may perform two or more calibrations in different modes simultaneously. It can be understood that different calibration modes may correspond to different calibration images. Calibration images configured by developers may be complex and changeable, or calibration images of different modes may be macroscopically very similar, with only microscopic differences. Therefore, the user may not know which calibration mode the calibration image belongs to. When performing the calibration, the user may place the calibration images incorrectly, resulting in a calibration error. For example, when performing print mode calibration, the copy mode calibration image may be placed; and when performing copy mode calibration, the print mode calibration image may be placed.

SUMMARY

One aspect of the present disclosure provides an image calibration method. The method includes outputting a calibration image in response to a calibration instruction inputted by a user, where the calibration image includes a calibration pattern and a calibration mark; and the calibration mark is configured to mark a calibration event or a calibration event type corresponding to the calibration image; according to the calibration mark of the calibration image, determining whether the calibration event corresponding to the calibration image matches a calibration event corresponding to a current calibration operation, or determining whether the calibration event type corresponding to the calibration image matches a calibration event type corresponding to a current calibration operation; and performing image calibration according to the calibration pattern in the calibration image if the calibration event corresponding to the calibration image matches the calibration event corresponding to the current calibration operation, or if the calibration event type corresponding to the calibration image matches the calibration event type corresponding to the current calibration operation.

Another aspect of the present disclosure provides an image forming apparatus. The apparatus includes a memory, storing a computer program for performing an image calibration method; and a processor, coupled with the memory and when the computer program being executed, configured to: output a calibration image in response to a calibration instruction inputted by a user, where the calibration image includes a calibration pattern and a calibration mark; and the calibration mark is configured to mark a calibration event or a calibration event type corresponding to the calibration image; according to the calibration mark of the calibration image, determine whether the calibration event corresponding to the calibration image matches a calibration event corresponding to a current calibration operation, or determine whether the calibration event type corresponding to the calibration image matches a calibration event type corresponding to a current calibration operation; and perform image calibration according to the calibration pattern in the calibration image if the calibration event corresponding to the calibration image matches the calibration event corresponding to the current calibration operation, or if the calibration event type corresponding to the calibration image matches the calibration event type corresponding to the current calibration operation.

Another aspect of the present disclosure provides a non-transitory computer-readable storage medium containing a computer program, where when being executed, the computer program causes a processor to perform any one of above-mentioned image control methods.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

FIG. 1 illustrates a schematic of an application scenario provided by exemplary embodiments of the present disclosure.

DETAILED DESCRIPTION

To better understand technical solutions of the present disclosure, embodiments of the present disclosure is described in detail with reference to accompanying drawings.

It should be noted that described embodiments are only a part of embodiments of the present disclosure, rather than all embodiments. Based on embodiments in the present disclosure, all other embodiments obtained by those skilled in the art without creative work shall fall within the protection scope of the present disclosure.

The terms used in embodiments of the present disclosure are only for the purpose of describing specific embodiments and are not intended to limit the present disclosure. The singular forms of "a", "the" and "said" used in embodiments of the present disclosure and the appended claims are also intended to include plural forms, unless the context clearly indicates other meanings.

It can be understood that the term "and/or" used in the specification may only be an association relationship describing associated objects, which means that there may be three types of relationships. For example, A and/or B can mean that: A alone exists, A and B exist at the same time, and B exists alone. In addition, the character "/" in the specification normally indicates that associated objects before and after are in an "or" relationship.

To obtain higher quality images, before using the image forming apparatus for job output, a calibration operation may need to be performed on the image forming apparatus. The calibration operation may include registration calibration processing, concentration calibration processing, and the like. For example, a color shift detection image, a concentration calibration image and the like may be printed on print papers by the image forming apparatus, then image data may be read by scanning the print papers, and the calibration may be performed. For example, the image forming apparatus with color image forming function may print color images on print papers using four colors of yellow, magenta, cyan and black, and may perform ACR (automatic color registration) to precisely align color registration at desired positions on print papers. The ACR function may be to calibrate relative positions where the four colors are formed so that the images of the four colors may be accurately aligned, and the image quality may be improved when the ACR function is executed.

In practical application scenarios, the user may perform two or more calibrations in different modes simultaneously. It can be understood that different calibration modes may correspond to different calibration images. Calibration images configured by developers may be complex and changeable, or calibration images of different modes may be macroscopically very similar, with only microscopic differences. Therefore, the user may not know which calibration mode the calibration image belongs to. When performing the calibration, the user may place the calibration images incorrectly, resulting in an incorrect calibration result. For example, when performing print mode calibration, the copy mode calibration image may be placed; and when performing copy mode calibration, the print mode calibration image may be placed.

Various embodiments of the present disclosure provide an image calibration method, an image forming apparatus, and a storage medium, which may be beneficial for solving the problem in the existing technology that under different calibration modes, the user may place the calibration image incorrectly which results in a calibration error.

Figure 1:
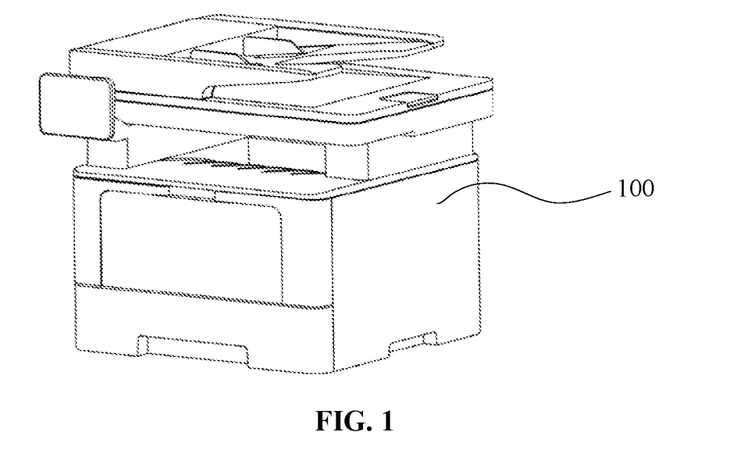

FIG. 1 illustrates a schematic of an application scenario provided by exemplary embodiments of the present disclosure. An image forming apparatus 100 is shown in FIG. 1; and the user may need to perform a calibration operation on the image forming apparatus 100 before performing print jobs using the image forming apparatus 100. It can be understood that FIG. 1 is only an exemplary illustration. The present disclosure may not limit the structure of the image forming apparatus 100 which may be a printer, a copier, a facsimile machine, a multifunctional image forming and copying apparatus, an electrostatic printing apparatus, and/or any other similar apparatus.

Figure 2:
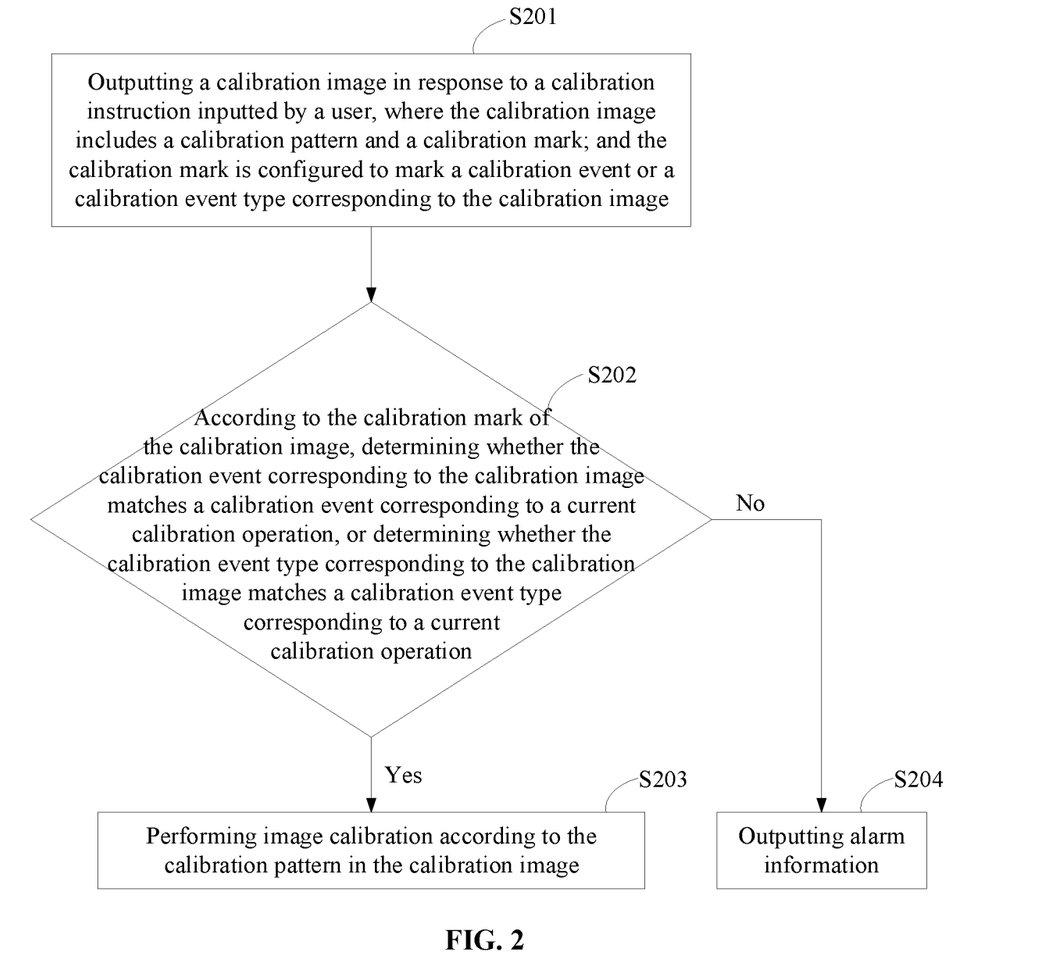
FIG. 2 illustrates a schematic flowchart of an image calibration method provided by exemplary embodiments of the present disclosure.

FIG. 2 illustrates a schematic flowchart of an image calibration method provided by exemplary embodiments of the present disclosure. The method may be applied to the application scenario shown in FIG. 1. As shown in FIG. 2, the method may mainly include following exemplary steps.

At S201, in response to the calibration instruction inputted by the user, the calibration image may be outputted. The calibration image may include a calibration pattern and a calibration mark; and the calibration mark may be configured to mark a calibration event or a calibration event type corresponding to the calibration image.

It can be understood that image calibration may normally include outputting the calibration image and performing the calibration operation using the calibration image.

In an optional embodiment, the above-mentioned "calibration image" and "calibration operation" may need to correspond to a same calibration trigger instruction, that is, to correspond to a same calibration event. On the contrary, if the calibration operation is performed in a calibration event B using the calibration image outputted in a calibration event A, a calibration error may occur.

For example, the calibration event may include one or a combination of information affecting image calibration, including mark time information, count information, serial number information, random sequence information, and/or the like.

Time information may be configured to characterize the output time of the calibration image. The calibration events A and B at this point may represent different time information. In an image forming apparatus having a clock, if the output time of the calibration image exceeds a preset time duration, the image forming condition inside the image forming apparatus may change, resulting in different calibration images for the calibration events A and B; and if the calibration images for the calibration events A and B are misplaced, the calibration quality may be affected. For example, the image forming apparatus has outputted the calibration image (calibration event A) at 8:00 am (calibration event A) according to the user's instruction, and the calibration image (calibration event A) may be inputted at 17:00 pm (calibration event B) for detection and calibration. During the period from 8:00 to 17:00, parts related to image formation may be replaced by the user in the image forming apparatus, or the internal image forming condition may change due to other factors. Therefore, performing the calibration operation in the calibration event B using the calibration image outputted in the calibration event A may result in a calibration error.

Count information may be configured to characterize the encoding order of the calibration images, or statistical information of the image forming apparatus. The statistical information of the image forming apparatus may include a total number of printed sheets, and an accumulated number of motor revolutions. For example, within a certain time duration, if the number of printed sheets of a same image forming apparatus exceeds a certain number, the toner concentration may be different before and after printing; and if the calibration images before and after printing are misplaced, the image calibration results may also be affected. The calibration marks and calibration images may also be different if the total number of printed sheets is 500 (calibration event A) and if the total number of printed sheets is 1000 (calibration event B).

Serial number information may be configured to characterize the serial number corresponding to the image forming apparatus. For example, if there are two image forming apparatuses, the first image forming apparatus and the second image forming apparatus may output different calibration marks. To avoid misplacement of calibration images between two image forming apparatuses, the calibration marks may contain information for distinguishing serial numbers.

Random sequence information may be configured to characterize the uniqueness of a current calibration operation. For example, random sequence information may be generated in a non-calibration pattern region of the calibration image. To avoid misplacement with other calibration images, the random sequence information may be configured to characterize the uniqueness of the current calibration operation.

Therefore, if the calibration operation is performed in the calibration event B using the calibration image outputted in the calibration event A, a calibration error may occur.

In another optional embodiment, the above-mentioned "calibration image" and "calibration operation" may correspond to a same calibration event type to complete the calibration operation. For example, a calibration event type A and a calibration event type B may both correspond to a print calibration mode, that is, calibration event types corresponding to the calibration event type A and the calibration event type B may be same, such that the calibration operation may be performed in the calibration event type B using the calibration image outputted in the calibration event type A.

The print calibration mode may include concentration calibration, color registration calibration, concentration and color registration calibration at different print speeds, and concentration calibration at different resolutions.

The copy calibration mode may include concentration calibration, concentration calibration at different print speeds, and concentration calibration at different resolutions.

For example, the calibration event types may include the print calibration mode and/or the copy calibration mode. Correspondingly, the calibration instructions inputted by the user may include a print calibration instruction, a copy calibration instruction, and/or the like. For example, when the user needs to perform print calibration, the print calibration instruction may be inputted on the image forming apparatus; and when the user needs to perform copy calibration, the copy calibration instruction may be inputted on the image forming apparatus. Corresponding to the calibration instructions, when the calibration instruction inputted by the user is the print calibration instruction, the outputted calibration image may be a print mode calibration image; and when the calibration instruction inputted by the user is the copy calibration instruction, the outputted calibration image may be a copy mode calibration image.

As mentioned above, the calibration images of different calibration events or calibration event types may be very similar in macroscopic view, so that the user may not distinguish the calibration events or calibration event types corresponding to the calibration images. Based on above description, in various embodiment of the present disclosure, the calibration mark may be added to the calibration image, and the calibration event or the calibration event type corresponding to the calibration image may be marked by the calibration mark. Obviously, the calibration image may also include the calibration pattern configured to carry calibration information.

At S202, according to the calibration mark of the calibration image, whether the calibration event corresponding to the calibration image matches the calibration event corresponding to the current calibration operation may be determined; or whether the calibration event type corresponding to the calibration image matches the calibration event type corresponding to the current calibration operation may be determined.

If the calibration mark is configured to mark the calibration event corresponding to the calibration image, it may determine whether the calibration event corresponding to the calibration image matches the calibration event corresponding to the current calibration operation; and if the calibration mark is configured to mark the calibration event type corresponding to the calibration image, it may determine whether the calibration event type corresponding to the calibration image matches the calibration event type corresponding to the current calibration operation. For example, the image forming apparatus may detect the calibration mark of the calibration image placed into the image forming apparatus by the user and obtain the calibration event or calibration event type corresponding to the calibration image. Implementation means of such detection manner may be scanning or other detection manners, which may not be limited in various embodiments of the present disclosure.

In an optional application scenario, the user may trigger the image forming apparatus to output two calibration images, that is, the print calibration image and the copy calibration image. From a macro point of view, these two calibration images may be substantially similar and may not be distinguished by the user. Therefore, the user may place any one of these calibration images into the image forming apparatus, and the image forming apparatus may scan the calibration image to obtain the calibration mark of the calibration image, and further determine whether the calibration event type corresponding to the calibration image matches the calibration event type corresponding to the current calibration operation.

For example, the calibration event type corresponding to the current calibration operation is the print calibration mode, and the image forming apparatus determines that the calibration event type corresponding to the calibration image is the print calibration mode according to the calibration mark of the calibration image, such that it may determine that the calibration event type corresponding to the calibration image matches the calibration event type corresponding to the current calibration operation; the calibration event type corresponding to the current calibration operation is the print calibration mode, and the image forming apparatus determines that the calibration event type corresponding to the calibration image is the copy calibration mode according to the calibration mark of the calibration image, such that it may determine that the calibration event type corresponding to the calibration image does not match the calibration event type corresponding to the current calibration operation; the calibration event type corresponding to the current calibration operation is the copy calibration mode, and the image forming apparatus determines that the calibration event type corresponding to the calibration image is the copy calibration mode according to the calibration mark of the calibration image, such that the calibration event type corresponding to the calibration image matches the calibration event type corresponding to the current calibration operation; and the calibration event type corresponding to the current calibration operation is the copy calibration mode, and the image forming apparatus determines that the calibration event type corresponding to the calibration image is the print calibration mode according to the calibration mark of the calibration image, such that the calibration event type corresponding to the calibration image does not match the calibration event type corresponding to the current calibration operation.

If the determination result is yes, execute S203; and if the determination result is no, execute S204.

At S203, image calibration may be performed according to the calibration pattern in the calibration image.

For example, if the calibration event corresponding to the calibration image matches the calibration event corresponding to the current calibration operation, or the calibration event type corresponding to the calibration image matches the calibration event type corresponding to the current calibration operation, it may indicate that the calibration image may be used for calibration. Therefore, the image forming apparatus may detect the calibration pattern in the calibration image, obtain detection data matching the calibration pattern, and determine a calibration value according to the detection data; and perform image calibration according to the calibration value, and save corresponding calibration result.

For example, the calibration event type corresponding to the current calibration operation is the print calibration mode, and it may determine in S202 that the calibration image currently placed into the image forming apparatus is the print calibration image. Therefore, the calibration pattern in the print calibration image may be detected, the detection data may be obtained, the calibration value may be determined according to the detection data, and the calibration value may be used for adjustment in a next print process.

At S204, alarm information may be outputted.

For example, if the calibration event corresponding to the calibration image does not match the calibration event corresponding to the current calibration operation, or the calibration event type corresponding to the calibration image does not match the calibration event type corresponding to the current calibration operation, alarm information may be outputted to prompt the user to replace the calibration image. The alarm information may be sound information, indicator light prompt information, display screen display information, and/or the like, which may not be limited in various embodiments of the present disclosure.

In various embodiments of the present disclosure, the calibration event or the calibration event type corresponding to the calibration image may be marked by the calibration mark, the image forming apparatus may identify the calibration mark and further determine whether the calibration event or calibration event type corresponding to the calibration image matches the calibration event or calibration event type corresponding to the current calibration operation, which may avoid that users incorrectly place calibration images not corresponding to the current calibration event or the current calibration event type, resulting in false triggering of wrong calibration operation.

Figure 3:
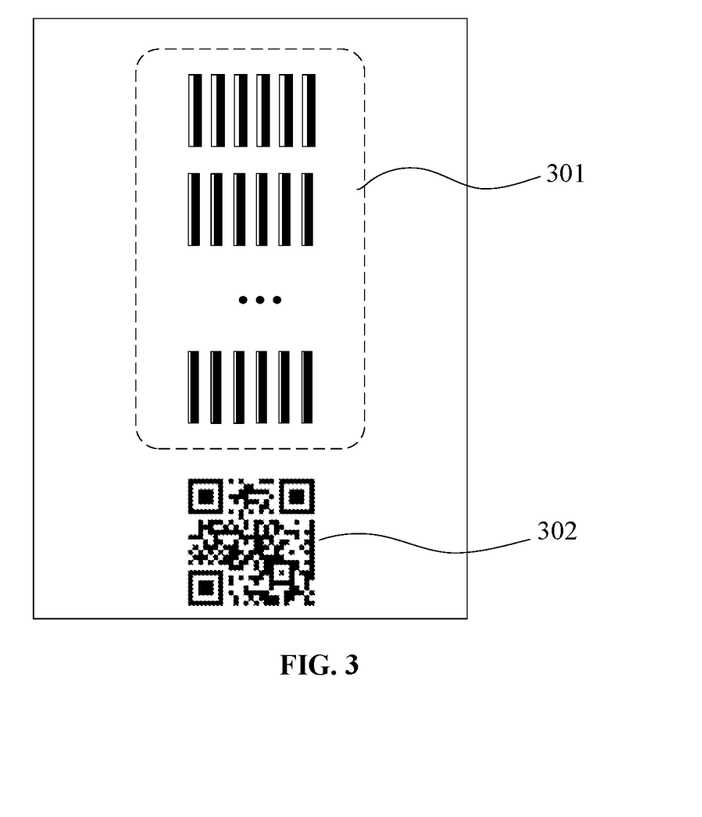
FIG. 3 illustrates a schematic of a calibration image provided by exemplary embodiments of the present disclosure.

FIG. 3 illustrates a schematic of a calibration image provided by exemplary embodiments of the present disclosure. As shown in FIG. 3, the calibration image may include a calibration pattern 301 and a calibration mark 302. In various embodiments of the present disclosure, the calibration mark 302 may be a two-dimensional code, that is, the two-dimensional code may carry information related to a calibration event or calibration event type.

In an implementation, the user may trigger the calibration instruction, the image forming apparatus may add a two-dimensional code to the calibration image as the calibration mark 302; and the two-dimensional code and the calibration pattern 301 may be printed out together. It can be understood that the calibration pattern 301 and the two-dimensional code should be in different regions in the calibration image to avoid overlapping.

When performing calibration, the user may place the calibration image into a scanning unit of the image forming apparatus, and the scanning unit may scan the calibration image, identify the two-dimensional code in the calibration image, and obtain the calibration mark 302; and furthermore, whether the calibration event corresponding to the calibration image matches the calibration event corresponding to the current calibration operation may be determined according to the calibration mark 302, or whether the calibration event type corresponding to the calibration image matches the calibration event type corresponding to the current calibration operation may be determined according to the calibration mark 302.

Figure 4:
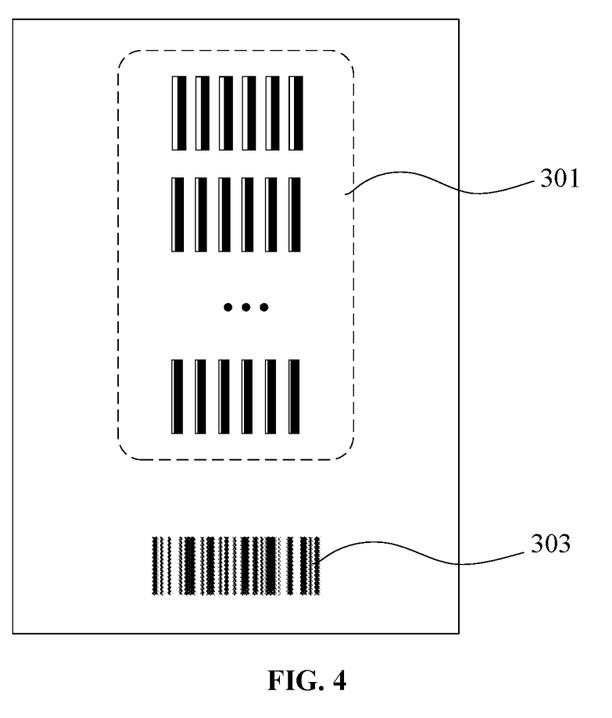
FIG. 4 illustrates a schematic of another calibration image provided by exemplary embodiments of the present disclosure.

FIG. 4 illustrates a schematic of another calibration image provided by exemplary embodiments of the present disclosure. The difference between the calibration image in FIG. 4 and the calibration image shown in FIG. 3 is that a calibration mark 303 is a barcode, that is, the barcode may carry information related to a calibration event or calibration event type.

Figure 5:
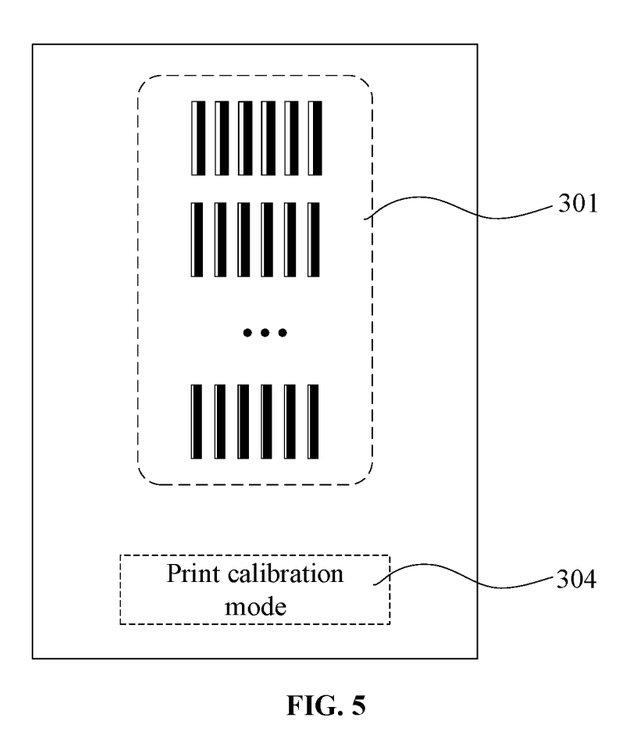
FIG. 5 illustrates a schematic of another calibration image provided by exemplary embodiments of the present disclosure.

FIG. 5 illustrates a schematic of another calibration image provided by exemplary embodiments of the present disclosure. The difference between the calibration image in FIG. 5 and the calibration image shown in FIG. 3 is that a calibration mark 304 is text information, that is, the text information may carry information related to a calibration event or calibration event type. In one embodiment shown in FIG. 5, the text information is "print calibration mode", that is, the calibration event type corresponding to the calibration image may be the print calibration mode.

Figure 6:
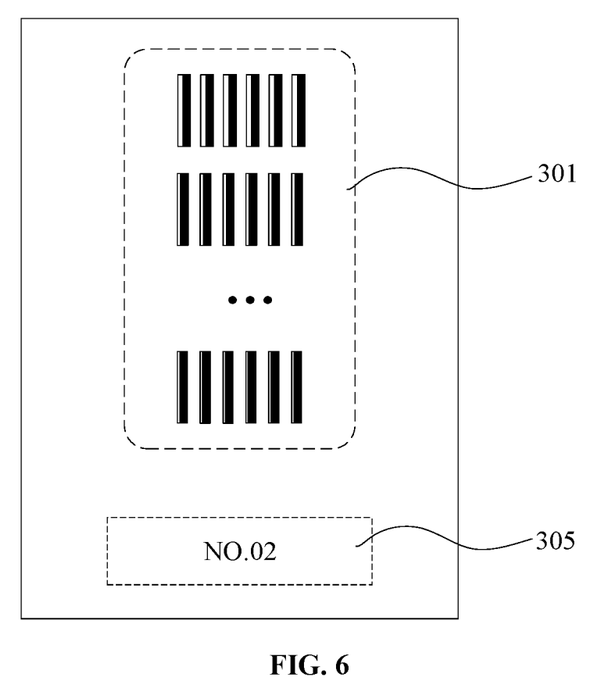
FIG. 6 illustrates a schematic of another calibration image provided by exemplary embodiments of the present disclosure.

FIG. 6 illustrates a schematic of another calibration image provided by exemplary embodiments of the present disclosure. The difference between the calibration image in FIG. 6 and the calibration image shown in FIG. 3 is that a calibration mark 305 is a digital label, that is, the digital label may carry the information related to a calibration event or calibration event type. If the corresponding relationship between the preset number label and the calibration event type is preset, a label NO. 01 may correspond to the print calibration mode; and a label NO. 02 may correspond to the copy calibration mode. In one embodiment of the present disclosure, the calibration event type corresponding to the calibration image may be determined to be the copy calibration mode through the label No. 02.

Figure 7:
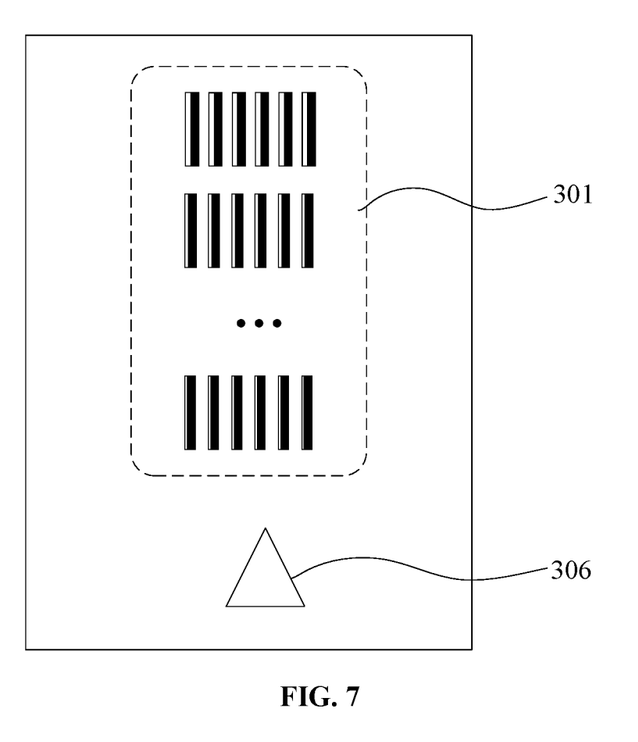
FIG. 7 illustrates a schematic of another calibration image provided by exemplary embodiments of the present disclosure.

FIG. 7 illustrates a schematic of another calibration image provided by exemplary embodiments of the present disclosure. The difference between the calibration image in FIG. 7 and the calibration image shown in FIG. 3 is that a calibration mark 306 is a replacement pattern mark, that is, the pattern may carry information related to a calibration event or calibration event type. If the corresponding relationship between the replacement pattern mark and the calibration event type is preset, the square may correspond to the print calibration mode; and the triangle may correspond to the copy calibration mode. In one embodiment of the present disclosure, the calibration event type corresponding to the calibration image may be determined to be the copy calibration mode through the "triangle" pattern.

Obviously, those skilled in the art may also use other patterns to represent different calibration events or calibration event types, which may not be limited in various embodiments of the present disclosure. For example, in an optional implementation manner, a hollow pattern may be configured to represent the print calibration mode, and a solid pattern may be configured to represent the copy calibration mode.

Figure 8:
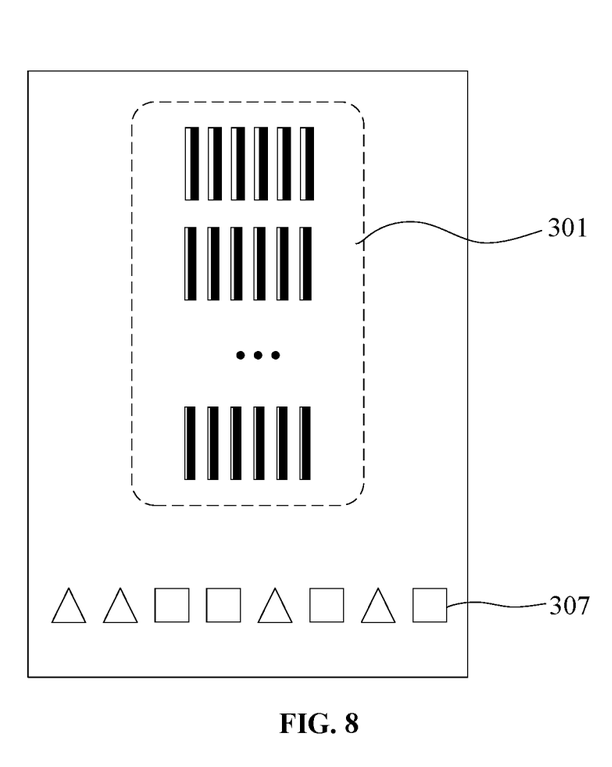
FIG. 8 illustrates a schematic of another calibration image provided by exemplary embodiments of the present disclosure.

FIG. 8 illustrates a schematic of another calibration image provided by exemplary embodiments of the present disclosure. The difference between the calibration image in FIG. 8 and the calibration image shown in FIG. 7 is that a calibration mark 307 is a combination of patterns, that is, the combination of patterns may carry information related to a calibration event or calibration event type. For example, 1 is represented by a square pattern, and 0 is represented by a triangle pattern, such that the combination of 8 square patterns and/or triangle patterns may form 256,256 combinations (2 to the 8th power=256,256), which are suitable for various combinations of calibration events. In one embodiment shown in FIG. 8, the binary information corresponding to the combination of square patterns and triangle patterns is 00110101.

In another optional implementation manner, a pattern size mark may also be used as the calibration mark. For example, a large size pattern may be configured to represent the print calibration mode, and a small size pattern may be configured to represent the copy calibration mode.

Obviously, those skilled in the art may also use other forms, for example, a position mark, a color mark, and/or the like, to configure the calibration marks, which may not be described in detail in various embodiment of the present disclosure.

It can be understood that FIGS. 3 to 8 may exemplarily illustrate external representations of the calibration marks listed in various embodiments of the present disclosure. The calibration mark may be configured to mark the calibration event or calibration event type corresponding to the calibration image.

In an optional implementation, the calibration event may include one or a combination of the following information, including time information configured to characterize the output time of the calibration image; count information configured to characterize the encoding order of the calibration images or statistical information of the image forming apparatus; serial number information configured to characterize the serial number corresponding to the image forming apparatus; and random sequence information configured to characterize the uniqueness of the current calibration operation.

Corresponding to above-mentioned method embodiments, the present disclosure further provides an image forming apparatus.

Figure 9:
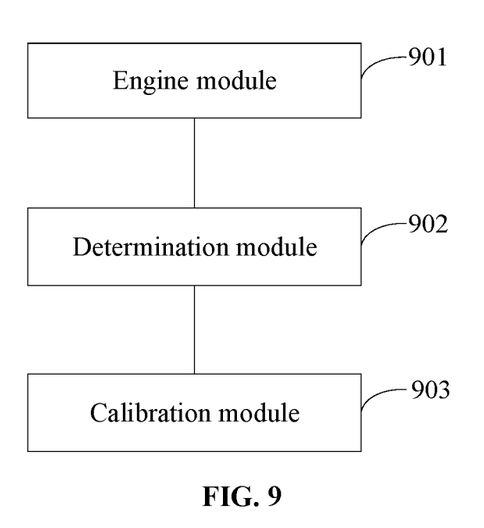
FIG. 9 illustrates a structural schematic of an image forming apparatus provided by exemplary embodiments of the present disclosure.

FIG. 9 illustrates a structural schematic of an image forming apparatus provided by exemplary embodiments of the present disclosure. As shown in FIG. 9, the image forming apparatus may mainly include following modules. An engine module 901 may be configured to, in response to the calibration instruction inputted by the user, output the calibration image, where the calibration image may include the calibration pattern and the calibration mark; and the calibration mark may be configured to mark the calibration event or the calibration event type corresponding to the calibration image. A determination module 902 may be configured to, according to the calibration mark of the calibration image, determine whether the calibration event corresponding to the calibration image matches the calibration event corresponding to the current calibration operation, or determine whether the calibration event type corresponding to the calibration image matches the calibration event type corresponding to the current calibration operation. A calibration module 903 may be configured to perform image calibration according to the calibration pattern in the calibration image if the calibration event corresponding to the calibration image matches the calibration event corresponding to the current calibration operation, or if the calibration event type corresponding to the calibration image matches the calibration event type corresponding to the current calibration operation.

In an optional implementation, the calibration event may include one or a combination of the following information, including time information configured to characterize the output time of the calibration image; count information configured to characterize the encoding order of the calibration images or statistical information of the image forming apparatus; serial number information configured to characterize the serial number corresponding to the image forming apparatus; and random sequence information configured to characterize the uniqueness of the current calibration operation.

In an optional embodiment, the calibration event type may include the print calibration mode and/or the copy calibration mode.

In an optional embodiment, the image forming apparatus may further include an alarm module, configured to output alarm information if the calibration event corresponding to the calibration image does not match the calibration event corresponding to the current calibration operation, or the calibration event type corresponding to the calibration image does not match the calibration event type corresponding to the current calibration operation.

In an optional embodiment, the image forming apparatus may further include a detection module, configured to detect the calibration mark of the calibration image, and obtain the calibration event or the calibration event type corresponding to the calibration image. In an optional embodiment, the detection module may be further configured to detect the calibration pattern in the calibration image and obtain detection data matching the calibration pattern. The detection module may be a built-in scanner on the image forming apparatus, or an external scanner, sensor and the like connected to the printer through a wired or wireless manner such as USB, which may not be limited in various embodiments of the present disclosure. In an optional embodiment, the calibration module may include a calibration value determination module and an engine control module. The calibration value determination module may be configured to determine the calibration value according to the detection data; and the engine control module may be configured to perform image calibration according to the calibration value.

The content of various embodiments of the present disclosure may refer to the description in above-mentioned method embodiments, which may not be described in detail herein for brevity.

In various embodiments of the present disclosure, the calibration event or the calibration event type corresponding to the calibration image may be marked by the calibration mark, the image forming apparatus may identify the calibration mark and further determine whether the calibration event or calibration event type corresponding to the calibration image matches the calibration event or calibration event type corresponding to the current calibration operation, which may avoid that users incorrectly place calibration images not corresponding to the current calibration event or the current calibration event type, resulting in false triggering of wrong calibration operation.

Corresponding to above-mentioned embodiments, the present disclosure further provides an image forming apparatus. The image forming apparatus may include a processor, a memory, and a computer program. The computer program may be stored in the memory, and the computer program may include instructions. When being executed, the instructions may cause the image forming apparatus to perform some or all steps of above-mentioned method embodiments.

In an implementation, various embodiments of the present disclosure further provide a non-transitory computer-readable storage medium containing a computer program, where when being executed, the computer program causes a processor to perform any one of above-mentioned image control methods. Above-mentioned storage medium may be a magnetic disk, an optical disc, a read-only memory (ROM), a random-access memory (RAM), and/or the like.

In an implementation, various embodiments of the present disclosure further provide a computer program product, where the computer program product may include executable instructions; and when being executed, above-mentioned executable instructions may cause the computer to perform some or all steps of above-mentioned method embodiments.

From above-mentioned embodiments, it may be seen that the solutions provided by the present disclosure may achieve at least the following beneficial effects.

In various embodiments of the present disclosure, the calibration event or the calibration event type corresponding to the calibration image may be marked by the calibration mark, the image forming apparatus may identify the calibration mark and further determine whether the calibration event or calibration event type corresponding to the calibration image matches the calibration event or calibration event type corresponding to the current calibration operation, which may avoid that users incorrectly place calibration images not corresponding to the current calibration event or the current calibration event type, resulting in false triggering of wrong calibration operation.

In embodiments of the present disclosure, "at least one" refers to one or more, and "a plurality of" refers to two or more. "And/or" may describe the association relationship of the associated objects, indicating that there can be three types of relationships. For example, A and/or B may indicate the situations where A exists alone, A and B exist at the same time, and B exists alone, where A and B may be singular or plural. The character "/" may normally indicate that associated objects before and after are in an "or" relationship. "The following at least one of" and similar expressions may refer to any combination of these items, including any combination of singular items or plural items. For example, at least one of a, b, and c may represent: a, b, c, a-b, a-c, b-c, or a-b-c, where a, b, and c can be singular or plural.

Those skilled in the art should understand that the units and steps described in embodiments in the present disclosure may be implemented by a combination of electronic hardware, computer software, and electronic hardware. Whether these functions are executed by hardware or software may depend on application and design constraint conditions of the technical solutions. Those skilled in the art may use different methods for each application to implement described functions, but such implementation should not be considered as beyond the scope of the present disclosure.

Those skilled in the art may clearly understand that, for the convenience and conciseness of the description, the working process of the system, apparatus and unit described above may refer to corresponding process in above-mentioned method embodiments, which may not be described in detail herein.

The above may merely be embodiments of the present disclosure. Changes or substitutions which can be easily thought by those skilled in the art within the technical scope disclosed by the present disclosure should be covered by the protection scope of the present disclosure. The protection scope of the present disclosure shall be subject to the protection scope of the claims.

What is claimed is:

1. An image calibration method, comprising:
outputting a calibration image in response to a calibration instruction inputted by a user, wherein the calibration image includes a calibration pattern and a calibration mark; and the calibration mark is configured to mark a calibration event or a calibration event type corresponding to the calibration image;
according to the calibration mark of the calibration image, determining whether the calibration event corresponding to the calibration image matches a calibration event corresponding to a current calibration operation, or determining whether the calibration event type corresponding to the calibration image matches a calibration event type corresponding to a current calibration operation, wherein the calibration event includes one or more selected from:

count information configured to characterize an encoding order of calibration images or statistical information of an image forming apparatus;

serial number information configured to characterize a serial number corresponding to the image forming apparatus; and random sequence information configured to characterize uniqueness of the current calibration operation; and performing image calibration according to the calibration pattern in the calibration image in response to a determination that the calibration event corresponding to the calibration image matches the calibration event corresponding to the current calibration operation, or in response to a determination that the calibration event type corresponding to the calibration image matches the calibration event type corresponding to the current calibration operation.

2. The method according to claim 1, wherein:
the calibration event type includes a print calibration mode and/or a copy calibration mode.

3. The method according to claim 1, wherein:
the calibration mark includes a position mark, a replacement pattern mark, a pattern size mark, a color mark, a two-dimensional code, a barcode, a digital label, text information, or a combination thereof.

4. The method according to claim 1, further including:
outputting alarm information in response to a determination that the calibration event corresponding to the calibration image does not match the calibration event corresponding to the current calibration operation, or in response to a determination that the calibration event type corresponding to the calibration image does not match the calibration event type corresponding to the current calibration operation.

5. The method according to claim 1, wherein according to the calibration mark of the calibration image, determining whether the calibration event corresponding to the calibration image matches the calibration event corresponding to the current calibration operation, or determining whether the calibration event type corresponding to the calibration image matches the calibration event type corresponding to the current calibration operation includes:

detecting the calibration mark of the calibration image, and obtaining the calibration event or the calibration event type corresponding to the calibration image; and determining whether the calibration event corresponding to the calibration image matches the calibration event corresponding to the current calibration operation or determining whether the calibration event type corresponding to the calibration image matches the calibration event type corresponding to the current calibration operation.

6. The method according to claim 1, wherein performing the image calibration according to the calibration pattern in the calibration image includes:

detecting the calibration pattern in the calibration image, and obtaining detection data matching the calibration pattern;

determining a calibration value according to the detection data; and performing the image calibration according to the calibration value.

7. The method according to claim 1, wherein the calibration event type includes a calibration event type A, and performing the image calibration comprises:

performing an image calibration in a calibration event type B using the calibration image in the calibration event type A, the calibration event type B being different from the calibration event type A.

8. The method according to claim 1, further comprising:
presenting the random sequence information in a non-calibration pattern region of the calibration image, the random sequence information being configured to characterize the uniqueness of the current calibration operation to avoid misplacement with other calibration images.

9. The method according to claim 1, wherein the calibration mark differentiates between a print calibration mode and a copy calibration mode, the print calibration mode includes concentration calibration and color registration calibration, and the copy calibration mode includes the concentration calibration but excludes the color registration calibration.

10. An image forming apparatus, comprising:
a memory, storing a computer program for performing an image calibration method; and
a processor, coupled with the memory and when the computer program being executed, configured to:
output a calibration image in response to a calibration instruction inputted by a user, wherein the calibration image includes a calibration pattern and a calibration mark; and the calibration mark is configured to mark a calibration event or a calibration event type corresponding to the calibration image;

according to the calibration mark of the calibration image, determine whether the calibration event corresponding to the calibration image matches a calibration event corresponding to a current calibration operation, or determine whether the calibration event type corresponding to the calibration image matches a calibration event type corresponding to a current calibration operation, wherein the calibration event includes one or more selected from count information configured to characterize an encoding order of calibration images or statistical information of an image forming apparatus;

serial number information configured to characterize a serial number corresponding to the image forming apparatus; and random sequence information configured to characterize uniqueness of the current calibration operation; and perform image calibration according to the calibration pattern in the calibration image in response to a determination that the calibration event corresponding to the calibration image matches the calibration event corresponding to the current calibration operation, or in response to a determination that the calibration event type corresponding to the calibration image matches the calibration event type corresponding to the current calibration operation.

11. The apparatus according to claim 10, wherein:
the calibration event type includes a print calibration mode and/or a copy calibration mode.

12. The apparatus according to claim 10, wherein:
the calibration mark includes a position mark, a replacement pattern mark, a pattern size mark, a color mark, a two-dimensional code, a barcode, a digital label, text information, or a combination thereof.

13. The apparatus according to claim 10, wherein the processor is further configured to:

output alarm information in response to a determination that the calibration event corresponding to the calibration image does not match the calibration event corresponding to the current calibration operation, or in response to a determination that the calibration event type corresponding to the calibration image does not match the calibration event type corresponding to the current calibration operation.

14. The apparatus according to claim 10, wherein for according to the calibration mark of the calibration image, determining whether the calibration event corresponding to the calibration image matches the calibration event corresponding to the current calibration operation, or determining whether the calibration event type corresponding to the calibration image matches the calibration event type corresponding to the current calibration operation, the processor is configured to:
  detect the calibration mark of the calibration image, and obtain the calibration event or the calibration event type corresponding to the calibration image; and
  determine whether the calibration event corresponding to the calibration image matches the calibration event corresponding to the current calibration operation or determine whether the calibration event type corresponding to the calibration image matches the calibration event type corresponding to the current calibration operation.

15. The apparatus according to claim 10, wherein for performing the image calibration according to the calibration pattern in the calibration image, the processor is configured to:
  detect the calibration pattern in the calibration image, and obtain detection data matching the calibration pattern;
  determine a calibration value according to the detection data; and
  perform the image calibration according to the calibration value.

16. A non-transitory computer-readable storage medium containing a computer program, wherein when being executed, the computer program causes a processor to perform an image calibration method, the method comprising:
  outputting a calibration image in response to a calibration instruction inputted by a user, wherein the calibration image includes a calibration pattern and a calibration mark; and the calibration mark is configured to mark a calibration event or a calibration event type corresponding to the calibration image;
  according to the calibration mark of the calibration image, determining whether the calibration event corresponding to the calibration image matches a calibration event corresponding to a current calibration operation, or determining whether the calibration event type corresponding to the calibration image matches a calibration event type corresponding to a current calibration operation, wherein the calibration event includes one or more selected from:
    count information configured to characterize an encoding order of calibration images or statistical information of an image forming apparatus;
    serial number information configured to characterize a serial number corresponding to the image forming apparatus; and
    random sequence information configured to characterize uniqueness of the current calibration operation; and
  performing image calibration according to the calibration pattern in the calibration image in response to a determination that the calibration event corresponding to the calibration image matches the calibration event corresponding to the current calibration operation, or in response to a determination that the calibration event type corresponding to the calibration image matches the calibration event type corresponding to the current calibration operation.

* * * * *